(12) United States Patent
Seifert et al.

(10) Patent No.: US 12,346,116 B2
(45) Date of Patent: Jul. 1, 2025

(54) ONLINE AUTHORING OF ROBOT AUTONOMY APPLICATIONS

(71) Applicant: Boston Dynamics, Inc., Waltham, MA (US)

(72) Inventors: Samuel Seifert, Boston, MA (US); Leland Hepler, Boston, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/466,535

(22) Filed: Sep. 13, 2023

(65) Prior Publication Data

US 2023/0418302 A1    Dec. 28, 2023

Related U.S. Application Data

(63) Continuation of application No. 16/884,954, filed on May 27, 2020, now Pat. No. 11,797,016.
(Continued)

(51) Int. Cl.
*G05D 1/00* (2024.01)

(52) U.S. Cl.
CPC ................. *G05D 1/0221* (2013.01)

(58) Field of Classification Search
None
See application file for complete search history.

(56) References Cited

U.S. PATENT DOCUMENTS 6,904,334 B2   6/2005   Asano et al.
8,060,344 B2   11/2011   Stathis
(Continued)

FOREIGN PATENT DOCUMENTS

WO   WO 2008/060689   5/2008
WO   WO 2021/211251   10/2021
(Continued)

OTHER PUBLICATIONS

Echegoyen et al., "Visual Servoing of Legged Robots", J Math Image Vision, Apr. 29, 2011;42(2-3):196-211.
(Continued)

*Primary Examiner* — Kyle T Johnson
*Assistant Examiner* — Arslan Azhar
(74) *Attorney, Agent, or Firm* — Knobbe, Martens, Olson & Bear LLP

(57) ABSTRACT

A method for online authoring of robot autonomy applications includes receiving sensor data of an environment about a robot while the robot traverses through the environment. The method also includes generating an environmental map representative of the environment about the robot based on the received sensor data. While generating the environmental map, the method includes localizing a current position of the robot within the environmental map and, at each corresponding target location of one or more target locations within the environment, recording a respective action for the robot to perform. The method also includes generating a behavior tree for navigating the robot to each corresponding target location and controlling the robot to perform the respective action at each corresponding target location within the environment during a future mission when the current position of the robot within the environmental map reaches the corresponding target location.

20 Claims, 12 Drawing Sheets

Related U.S. Application Data

(60) Provisional application No. 63/009,119, filed on Apr. 13, 2020.

(56) References Cited

U.S. PATENT DOCUMENTS

| | | | |
|---|---|---|---|
| 8,410,732 B2 | 4/2013 | Kassow et al. | |
| 8,594,844 B1 | 11/2013 | Gal | |
| 8,614,559 B2 | 12/2013 | Kassow et al. | |
| 8,725,273 B2 | 5/2014 | Lenser et al. | |
| 8,779,715 B2 | 7/2014 | Kassow et al. | |
| 8,929,603 B1 | 1/2015 | Maali et al. | |
| 9,592,912 B1* | 3/2017 | Michini | G01C 15/06 |
| 9,747,698 B2 | 8/2017 | Stathis | |
| 9,770,823 B2 | 9/2017 | Huang | |
| 9,858,712 B1 | 1/2018 | Stathis | |
| 9,876,993 B2 | 1/2018 | Sablak et al. | |
| 10,155,166 B1 | 12/2018 | Taylor et al. | |
| 11,331,799 B1 | 5/2022 | Shafer | |
| 11,372,408 B1 | 6/2022 | Webster et al. | |
| 11,416,003 B2 | 8/2022 | Whitman et al. | |
| 11,787,050 B1 | 10/2023 | Kaehler et al. | |
| 11,797,016 B2 | 10/2023 | Seifert et al. | |
| 2002/0169733 A1 | 11/2002 | Peters, II et al. | |
| 2002/0183896 A1 | 12/2002 | Ogure et al. | |
| 2004/0193321 A1 | 9/2004 | Anfindsen et al. | |
| 2004/0199302 A1 | 10/2004 | Pillar et al. | |
| 2005/0041839 A1 | 2/2005 | Saitou et al. | |
| 2005/0126144 A1 | 6/2005 | Koselka et al. | |
| 2005/0222713 A1 | 10/2005 | Kawabe et al. | |
| 2009/0052740 A1 | 2/2009 | Sonoura | |
| 2010/0036527 A1 | 2/2010 | Matsunaga et al. | |
| 2011/0231016 A1 | 9/2011 | Goulding | |
| 2012/0121161 A1 | 5/2012 | Eade et al. | |
| 2012/0155775 A1 | 6/2012 | Ahn et al. | |
| 2012/0158183 A1 | 6/2012 | Lim et al. | |
| 2012/0197464 A1* | 8/2012 | Wang | B25J 5/00 701/28 |
| 2012/0280087 A1* | 11/2012 | Coffman | G05D 1/0016 244/175 |
| 2013/0231779 A1 | 9/2013 | Purkayastha et al. | |
| 2013/0338525 A1 | 12/2013 | Allen | |
| 2014/0129027 A1 | 5/2014 | Schnittman | |
| 2014/0336848 A1 | 11/2014 | Saund et al. | |
| 2015/0269439 A1 | 9/2015 | Versace et al. | |
| 2015/0296142 A1 | 10/2015 | Cappel-Porter et al. | |
| 2016/0188977 A1 | 6/2016 | Kearns et al. | |
| 2017/0329347 A1 | 11/2017 | Passot et al. | |
| 2017/0358201 A1 | 12/2017 | Govers et al. | |
| 2018/0141562 A1 | 5/2018 | Singhal | |
| 2018/0181137 A1 | 6/2018 | Choi et al. | |
| 2018/0236654 A1 | 8/2018 | Mozeika et al. | |
| 2018/0364045 A1 | 12/2018 | Williams et al. | |
| 2019/0086894 A1 | 3/2019 | Tenorth | |
| 2019/0184572 A1 | 6/2019 | Hayashi | |
| 2019/0185186 A1 | 6/2019 | Li | |
| 2019/0307106 A1 | 10/2019 | Hartung et al. | |
| 2020/0012239 A1* | 1/2020 | Yamamoto | G06F 11/3696 |
| 2020/0070343 A1 | 3/2020 | Thomaz et al. | |
| 2020/0174484 A1 | 6/2020 | Eoh et al. | |
| 2020/0206918 A1 | 7/2020 | Sun | |
| 2021/0041243 A1 | 2/2021 | Fay et al. | |
| 2021/0041878 A1 | 2/2021 | Seifert et al. | |
| 2021/0181750 A1* | 6/2021 | Gogna | G08G 1/167 |
| 2021/0318687 A1 | 10/2021 | Seifert et al. | |
| 2021/0346557 A1 | 11/2021 | Brooks et al. | |
| 2022/0083061 A1 | 3/2022 | Xie et al. | |
| 2022/0113745 A1 | 4/2022 | Panigrahi et al. | |
| 2022/0138612 A1 | 5/2022 | Vengertsev et al. | |
| 2022/0139027 A1 | 5/2022 | Luo et al. | |
| 2022/0194245 A1 | 6/2022 | Gonana et al. | |
| 2022/0237910 A1 | 7/2022 | Hirai et al. | |
| 2022/0258356 A1 | 8/2022 | Chi et al. | |
| 2022/0305657 A1 | 9/2022 | Hong et al. | |
| 2022/0388174 A1 | 12/2022 | Stathis et al. | |
| 2023/0015335 A1 | 1/2023 | Gao et al. | |
| 2023/0016514 A1 | 1/2023 | Zheng et al. | |
| 2023/0087057 A1 | 3/2023 | Wang et al. | |
| 2023/0215024 A1 | 7/2023 | Huang | |
| 2023/0297118 A1 | 9/2023 | Yanks et al. | |
| 2023/0400863 A1 | 12/2023 | Chen et al. | |
| 2023/0418305 A1 | 12/2023 | Chestnutt et al. | |
| 2024/0087738 A1 | 3/2024 | Wang et al. | |
| 2024/0377843 A1 | 11/2024 | Ryde et al. | |

FOREIGN PATENT DOCUMENTS

| | | |
|---|---|---|
| WO | WO 2022/256818 | 12/2022 |
| WO | WO 2023/140928 | 7/2023 |

OTHER PUBLICATIONS

Girshick, R., "Fast R-CNN" Computer Vision and Pattern Recognition, arXiv:1504.08083 [cs.CV] version 2 dated Sep. 27, 2015 in 9 pages.

Hosoda et al., "Vision-Based Servoing Control for Legged Robots". 1997 IEEE Inter'l Conf Robot Auto, Apr. 1997;4:3154-3159.

Hutchinson et al., "A Tutorial on Visual Servo Control" IEEE Trans Robot Autom. Oct. 1996; 12(5):651-670.

Rublee et al., "ORB: an efficient alternative to Sift or Surf", 2011 Inter'l Conf Comp Vision. Nov. 6, 2011 (pp. 2564-2571), IEEE.

Scheper, "Behavior Trees for Evolutional Robotics Reducing the Reality Gap." Jun. 18, 2014, 197 pages.

International Search Report and Written Opinion received in Application No. PCT/US2021/022928, mailed Jun. 1, 2021, 10 pages.

International Search Report and Written Opinion received in Application No. PCT/US2022/072714, mailed Sep. 19, 2022, 18 pages.

International Search Report and Written Opinion received in Application No. PCT/US2022/051064, mailed Mar. 29, 2023, 10 pages.

International Search Report and Written Opinion received in Application No. PCT/US2023/084269, mailed May 7, 2024, 15 pages.

* cited by examiner

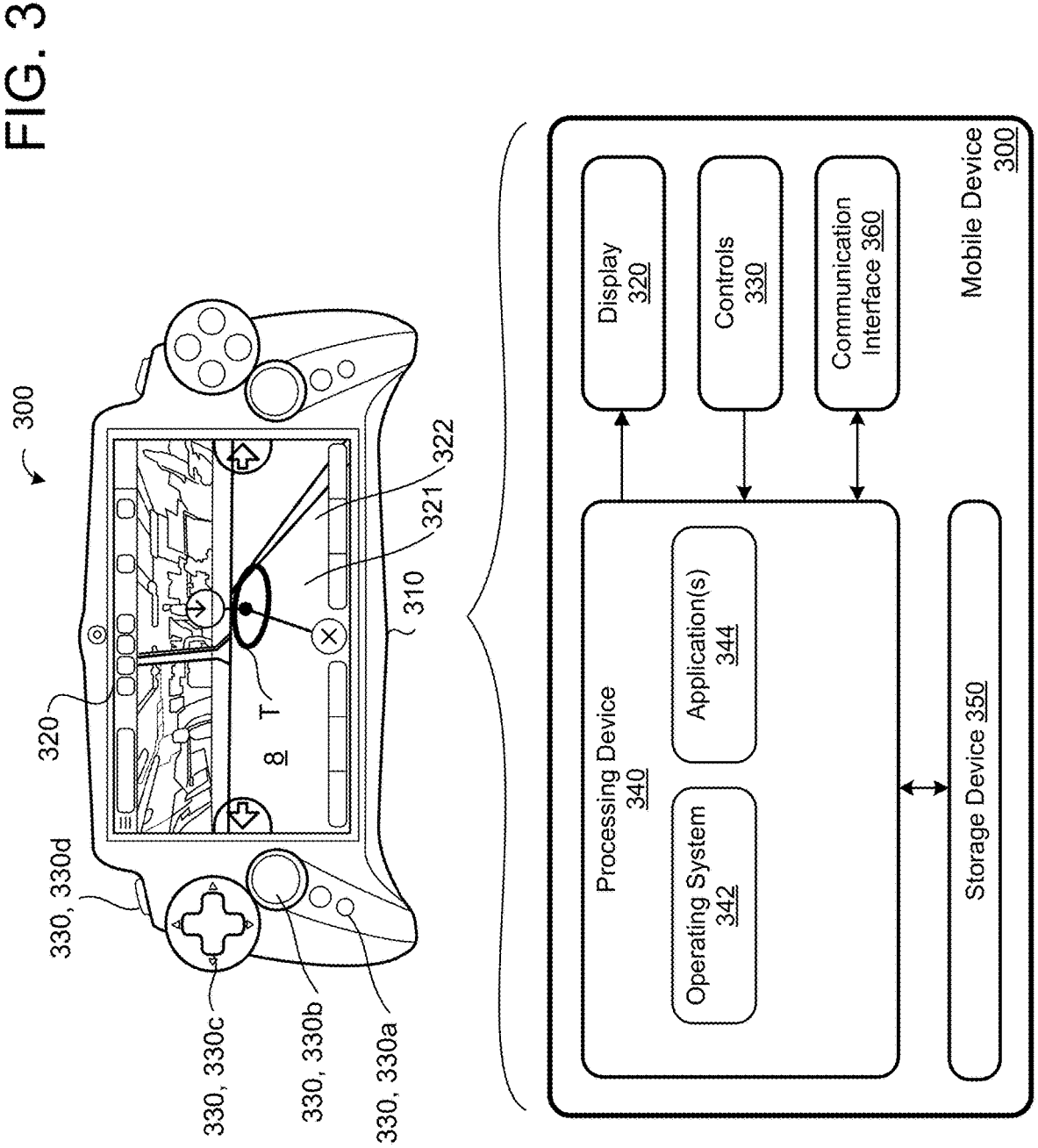

ONLINE AUTHORING OF ROBOT AUTONOMY APPLICATIONS

CROSS REFERENCE TO RELATED APPLICATIONS

This U.S. Patent Applications is a continuation of, and claims priority under 35 U.S.C. § 120 from, U.S. patent application Ser. No. 16/884,954, filed on May 27, 2020, which claims priority under 35 U.S.C. § 119(e) to U.S. Provisional Application No. 63/009,119, filed on Apr. 13, 2020, each of which is considered part of the disclosure of this application and is hereby incorporated by reference in its entirety.

TECHNICAL FIELD

This disclosure relates to online authoring of robot autonomy applications.

BACKGROUND

Robotic devices are increasingly being used to navigate constrained environments to perform a variety of tasks or functions. These robotic devices often need to navigate through these constrained environments without contacting the obstacles or becoming stuck or trapped. Typically, robots perform simultaneous localization and mapping (SLAM) to construct an environmental map of the robot's surroundings (including obstacles). After generation of the map, a user may interact with the generated map to set parameters for a future mission.

SUMMARY

One aspect of the disclosure provides a method for online authoring of robot autonomy applications. The method includes receiving, at data processing hardware of a robot, from at least one sensor in communication with the data processing hardware, sensor data of an environment about the robot while the robot traverses through the environment. The method also includes generating, by the data processing hardware, an environmental map representative of the environment about the robot based on the received sensor data of the environment about the robot while the robot traverses through the environment. While generating the environmental map, the method includes localizing, by the data processing hardware, a current position of the robot within the environmental map. The method also includes, at each corresponding target location of one or more target locations within the environment about the robot, recording, by the data processing hardware, a respective action for the robot to perform. The method also includes generating, by the data processing hardware, a behavior tree for navigating the robot to each corresponding target location of the one or more target locations and controlling the robot to perform the respective action at each corresponding target location of the one or more target locations within the environment during a future mission when the current position of the robot within the environmental map reaches the corresponding target location.

Implementations of the disclosure may include one or more of the following optional features. In some implementations, the respective action recorded for the robot to perform at the corresponding target location of at least one of the one or more target locations is selected from a playbook of actions associated with the corresponding target location. The playbook of actions associated with the corresponding target location may include a collection of prebuilt behavior tree portions associated with the corresponding target location, and each prebuilt behavior tree portion may be associated with a different action for the robot to perform at the corresponding target location. Generating the behavior tree may include combining two or more prebuilt behavior tree portions, where each prebuilt behavior tree portion of the combined two or more prebuilt behavior tree portions is associated with a different corresponding target location and selected from the corresponding collection of prebuilt behavior tree portions associated with the corresponding target location.

In some examples, the method includes, prior to recording the respective action for the robot to perform, receiving, at the data processing hardware, from a user device in communication with the data processing hardware, an action recording request when the current position of the robot within the environmental map reaches the corresponding target location. The action recording request requests the data processing hardware to record the respective action for the robot to perform at the corresponding target location. The user device may be configured to display a graphical user interface on a screen of the user device. The graphical user interface has an action selection window presenting one or more available actions for the robot to perform. The user device may also receive, in the action selection window, the respective action for the robot to perform at each corresponding target location of the one or more target locations within the environment.

Optionally, in response to receiving the action recording request, the method includes obtaining, by the data processing hardware, additional information relevant to the respective action. Recording the respective action for the robot to perform at the corresponding target location may include recording the additional information relevant to the respective action for the robot to perform at the corresponding target location.

Recording the respective action for the robot to perform at the corresponding target location may include associating the current position of the robot within the environmental map with the respective action for the robot to perform at the corresponding target location and storing, in memory hardware in communication with the data processing hardware, the association of the current position of the robot within the environmental map with the respective action for the robot to perform at the corresponding target location.

In some implementations, recording the respective action for the robot to perform at the corresponding target location further includes obtaining additional information relevant to the respective action. The method may include, after generating the environmental map and the behavior tree, and while navigating the robot through the environment during the future mission, determining, by the data processing hardware, using the environmental map and the behavior tree, when the current position of the robot within the environmental map reaches one of the one or more target locations within the environment about the robot. When the current position of the robot within the environmental map reaches the one of the one or more target locations, the method may include controlling, by the data processing hardware, the robot to perform the respective action at the corresponding target location.

In some implementations, generating the environmental map includes receiving input from a user device directing the robot to move about the environment. As the robot moves about the environment, the method may include capturing the sensor data of the environment. Optionally, generating the behavior tree includes determining, for each respective action recorded for the robot to perform, a corresponding orientation for the robot.

In some examples, the method includes generating, by the data processing hardware, an updated environmental map representative of the environment about the robot based on new received sensor data of the environment about the robot while the robot traverses through the environment and generating, by the data processing hardware, a second behavior tree for controlling the robot to perform the respective action at each corresponding target location of the one or more target locations within the environment during the future mission when the current position of the robot within the updated environmental map reaches the corresponding target location. The at least one sensor may include an image sensor including one or more of a stereo camera, a scanning light-detection and ranging (LIDAR) sensor, or a scanning laser-detection and ranging (LADAR) sensor.

Another aspect of the disclosure provides a system for online authoring of robot autonomy applications. The system includes data processing hardware and memory hardware in communication with the data processing hardware of a robot. The memory hardware stores instructions that when executed on the data processing hardware cause the data processing hardware to perform operations. The operations include receiving, from at least one sensor in communication with the data processing hardware, sensor data of an environment about the robot while the robot traverses through the environment. The operations also include generating an environmental map representative of the environment about the robot based on the received sensor data of the environment about the robot while the robot traverses through the environment. While generating the environmental map, the operations include localizing a current position of the robot within the environmental map. The operations also include, at each corresponding target location of one or more target locations within the environment about the robot, recording a respective action for the robot to perform. The operations also include generating a behavior tree for navigating the robot to each corresponding target location of the one or more target locations and controlling the robot to perform the respective action at each corresponding target location of the one or more target locations within the environment during a future mission when the current position of the robot within the environmental map reaches the corresponding target location.

This aspect may include one or more of the following optional features. In some implementations, the respective action recorded for the robot to perform at the corresponding target location of at least one of the one or more target locations is selected from a playbook of actions associated with the corresponding target location. The playbook of actions associated with the corresponding target location may include a collection of prebuilt behavior tree portions associated with the corresponding target location, and each prebuilt behavior tree portion may be associated with a different action for the robot to perform at the corresponding target location. Generating the behavior tree may include combining two or more prebuilt behavior tree portions, where each prebuilt behavior tree portion of the combined two or more prebuilt behavior tree portions is associated with a different corresponding target location and selected from the corresponding collection of prebuilt behavior tree portions associated with the corresponding target location.

In some examples, the operations include, prior to recording the respective action for the robot to perform, receiving, from a user device in communication with the data processing hardware, an action recording request when the current position of the robot within the environmental map reaches the corresponding target location. The action recording request requests the data processing hardware to record the respective action for the robot to perform at the corresponding target location. The user device may be configured to display a graphical user interface on a screen of the user device. The graphical user interface has an action selection window presenting one or more available actions for the robot to perform. The user device may also receive, in the action selection window, the respective action for the robot to perform at each corresponding target location of the one or more target locations within the environment.

Optionally, in response to receiving the action recording request, the operations include obtaining additional information relevant to the respective action. Recording the respective action for the robot to perform at the corresponding target location may include recording the additional information relevant to the respective action for the robot to perform at the corresponding target location.

Recording the respective action for the robot to perform at the corresponding target location may include associating the current position of the robot within the environmental map with the respective action for the robot to perform at the corresponding target location and storing, in the memory hardware in communication with the data processing hardware, the association of the current position of the robot within the environmental map with the respective action for the robot to perform at the corresponding target location.

In some implementations, recording the respective action for the robot to perform at the corresponding target location further includes obtaining additional information relevant to the respective action. The operations may include, after generating the environmental map and the behavior tree, and while navigating the robot through the environment during the future mission, determining, using the environmental map and the behavior tree, when the current position of the robot within the environmental map reaches one of the one or more target locations within the environment about the robot. When the current position of the robot within the environmental map reaches the one of the one or more target locations, the operations may include controlling the robot to perform the respective action at the corresponding target location.

In some implementations, generating the environmental map includes receiving input from a user device directing the robot to move about the environment. As the robot moves about the environment, the operations may include capturing the sensor data of the environment. Optionally, generating the behavior tree includes determining, for each respective action recorded for the robot to perform, a corresponding orientation for the robot.

In some examples, the operations include generating an updated environmental map representative of the environment about the robot based on new received sensor data of the environment about the robot while the robot traverses through the environment and generating a second behavior tree for controlling the robot to perform the respective action at each corresponding target location of the one or more target locations within the environment during the future mission when the current position of the robot within the updated environmental map reaches the corresponding target location. The at least one sensor may include an image sensor including one or more of a stereo camera, a scanning light-detection and ranging (LIDAR) sensor, or a scanning laser-detection and ranging (LADAR) sensor.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3 is a schematic view of exemplary components of a user device.

Like reference symbols in the various drawings indicate like elements.

DETAILED DESCRIPTION

As robotic devices (also referred to as "robots") become more prevalent, there is an increasing need to be able to quickly and easily map a space and set mission parameters for robots to perceive or interact with the environment about the robot autonomously. Today, this is accomplished by first maneuvering the robot around the environment to generate an environmental map. After the map is generated, the user interacts with the generated map to set mission parameters for the robot to complete autonomously. For example, the user may indicate a point on the environmental map that the robot should autonomously navigate to and perform an action (e.g., open a door). Thus, the user must separately map the environment and author behavior steps. Mapping the environment and then separately authorizing behavior steps not only requires additional time, but also requires the user to be able to accurately interpret the environmental map in order to correctly author the intended actions. The nature of the generated environmental map (e.g., a topographical map) often makes this difficult. Users typically record the action by manually generating a behavior tree for the robot via an application programming interface (API) using a graphical user interface (GUI).

Implementations herein are directed toward an online authoring system that allows users of a robot to quickly map a space while simultaneously recording one or more actions to perform within that same space. The user may control or "drive" the robot through an environment to create a map and simultaneously localize that map so that the robot may track its location relative to the map. That is, the robot may perform simultaneous localization and mapping (SLAM). While performing SLAM (i.e., while the user navigates the robot through the environment), the online authoring system allows the user to also record one or more actions to perform during a future mission. The user may select an action from a playbook of actions and the robot may automatically generate a corresponding behavior tree during recording. The robot may combine prebuilt behavior tree portions or chunks to generate the behavior tree.

Figure 1:
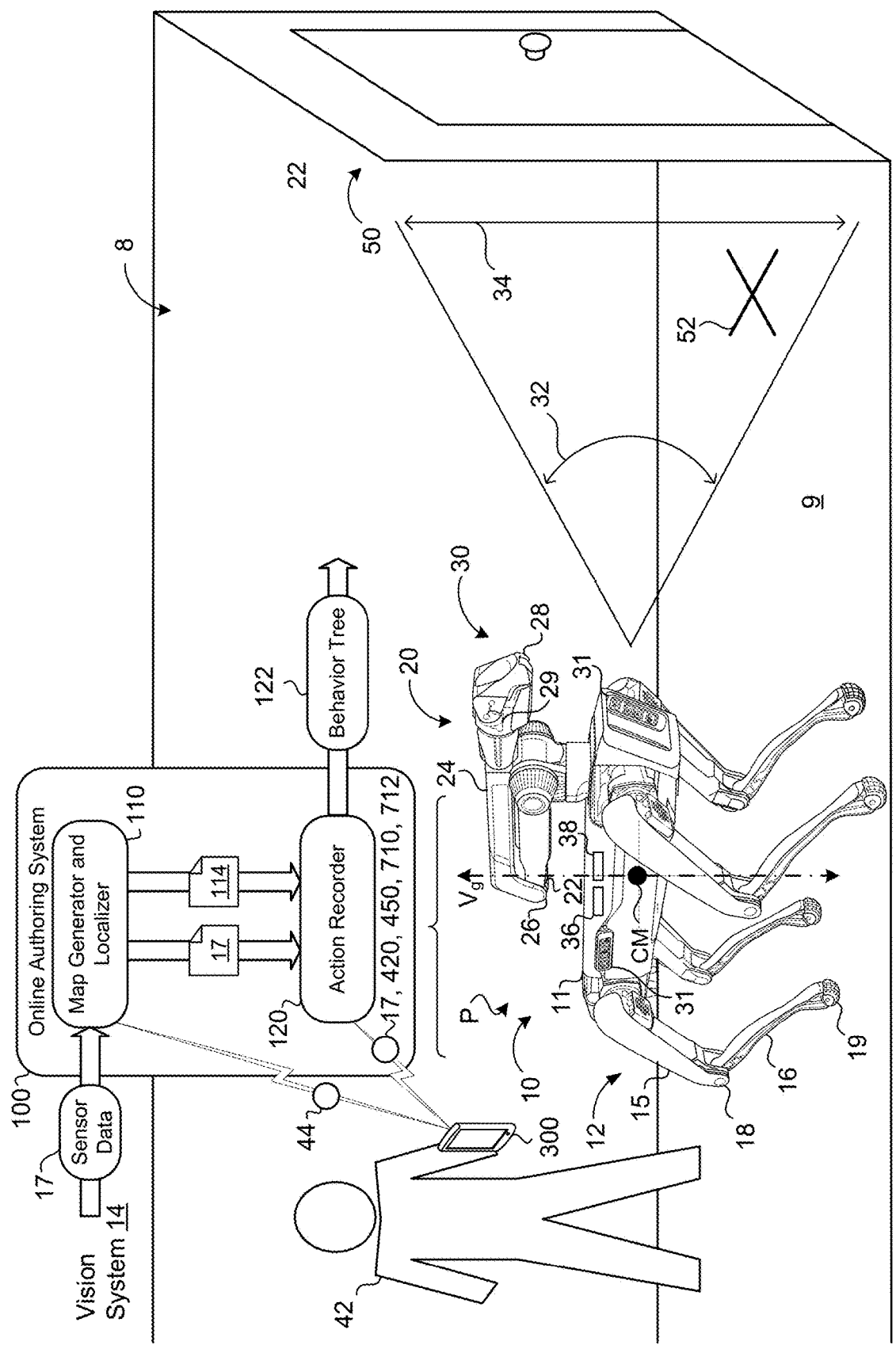
FIG. 1 is a schematic view of an example system for online authoring of robot autonomy applications.

Referring to FIG. 1, a robot or robotic device 10 includes a body 11 with, for example, two or more legs 12 and executes an online authoring system 100 for enabling the robot 10 map the environment 8 while simultaneously recording one or more actions to perform within the environment. Each leg 12 is coupled to the body 11 and may have an upper portion 15 and a lower portion 16 separated by a leg joint 18. The lower portion 16 of each leg 12 ends in a foot 19. The foot 19 of each leg is optional and the terminal end of the lower portion of one or more of the leg 12 may be coupled to a wheel or the distal end of each leg 12 may directly contact the a ground surface 9. The robot 10 has a vertical gravitational axis Vg along a direction of gravity, and a center of mass CM, which is a point where the weighted relative position of the distributed mass of the robot 10 sums to zero. The robot 10 further has a pose P based on the CM relative to the vertical gravitational axis Vg (i.e., the fixed reference frame with respect to gravity) to define a particular attitude or stance assumed by the robot 10. The attitude of the robot 10 can be defined by an orientation or an angular position of the robot 10 in space. Movement by the legs 12 relative to the body 11 alters the pose P of the robot 10 (i.e., the combination of the position of the CM of the robot and the attitude or orientation of the robot 10).

In some implementations, the robot 10 further includes one or more appendages, such as an articulated arm 20 disposed on the body 11 and configured to move relative to the body 11. The articulated arm 20 may have five-degrees or more of freedom. Moreover, the articulated arm 20 may be interchangeably referred to as a manipulator arm or simply an appendage. In the example shown, the articulated arm 20 includes two portions 22, 24 rotatable relative to one another and also the body 11; however, the articulated arm 20 may include more or less portions without departing from the scope of the present disclosure. The first portion 22 may be separated from second portion 24 by an articulated arm joint 26. An end effector 28, which may be interchangeably referred to as a manipulator head 28, may be coupled to a distal end of the second portion 24 of the articulated arm 20 and may include one or more actuators 29 for gripping/grasping objects.

The robot 10 also includes a vision system 30 with at least one imaging sensor or camera 31, each sensor or camera 31 capturing image data or sensor data 17 of the environment 8 surrounding the robot 10 with an angle of view 32 and within a field of view 34. The vision system 30 may be configured to move the field of view 34 by adjusting the angle of view 32 or by panning and/or tilting (either independently or via the robot 10) the camera 31 to move the field of view 34 in any direction. Alternatively, the vision system 30 may include multiple sensors or cameras 31 such that the vision system 30 captures a generally 360-degree field of view around the robot 10.

The camera(s) 31 of the vision system 30, in some implementations, include one or more stereo cameras (e.g., one or more RGBD stereo cameras). In other examples, the vision system 30 includes one or more radar sensors such as a scanning light-detection and ranging (LIDAR) sensor, or a scanning laser-detection and ranging (LADAR) sensor, a light scanner, a time-of-flight sensor, or any other threedimensional (3D) volumetric image sensor (or any such combination of sensors). In some implementations, the online authoring system 100 receives and processes the sensor data 17 and passes the processed sensor data 17 to a map generator and localizer (MGAL) 110.

The vision system 30 provides image data or sensor data 17 derived from image data captured by the cameras or sensors 31 to data processing hardware 36 of the robot 10. The data processing hardware 36 is in digital communication with memory hardware 38 and, in some implementations, may be a remote system. The remote system may be a single computer, multiple computers, or a distributed system (e.g., a cloud environment) having scalable/elastic computing resources and/or storage resources. An online authoring system 100 of the robot 10 executes on the data processing hardware 36.

Using the processed sensor data 17, the MGAL 110 generates an environmental map 114 representative of the environment 8 about the robot 10 while the robot traverses through the environment 8. For example, the MGAL 110 receives input 44 from a user device 300 associated with a user 42 (i.e., the operator) to move about the environment 8. As the robot 10 moves about the environment 8, the vision system 14 captures sensor data 17 of the environment 8. While generating the environmental map 114, the MGAL 110 also localizes a current position of the robot 10 within the environmental map 114. That is, in some implementations, the MGAL 110 performs SLAM using the sensor data 17. The MGAL 110 may use any SLAM techniques, such as Kalman filters, Monte Carlo methods, self-membership techniques, and maximum a posteriori estimation.

While performing SLAM, an action recorder 120 of the online authoring system 100 may, at each corresponding target location 52 of one or more target locations 52 within the environment 8 about the robot 10, record a respective action 420 (FIG. 4) for the robot 10 to perform (e.g., during a future mission). In the example shown, the target location 52 is in front of a door 50 and the action may be opening the door 50. In this situation, the target location 52 is positioned such that when the robot 10 autonomously navigates to the target location 52 during a future mission, the robot 10 may use the articulated arm 20 and associated end effector 28 to reach for, and grasp, the door 50 to perform the action 420 (i.e., open the door).

The action recorder 120 receives the environmental map 114 from the MGAL 110. In some examples, the action recorder 120 also receives processed sensor data 17 from the MGAL 110. The action recorder 120 automatically generates a behavior tree 122 for navigating and controlling the robot 10 to perform the respective action 420 at each corresponding target location 52 of the one or more target locations 52 within the environment 8 during the future mission when the current position of the robot 10 within the environmental map 114 reaches the corresponding target location 52. That is, the behavior tree 122 includes a series of instructions for the robot 10 to follow that allows the robot to navigate to each of the target locations 52 and perform the specified action 420. The behavior tree 122 describes the switchings between a finite set of tasks in a modular fashion. The behavior tree 122 may include nodes 622 (FIGS. 6A and 6B) that describe simple tasks that, when combined, create a complex task associated with an action 420.

Figure 2A:
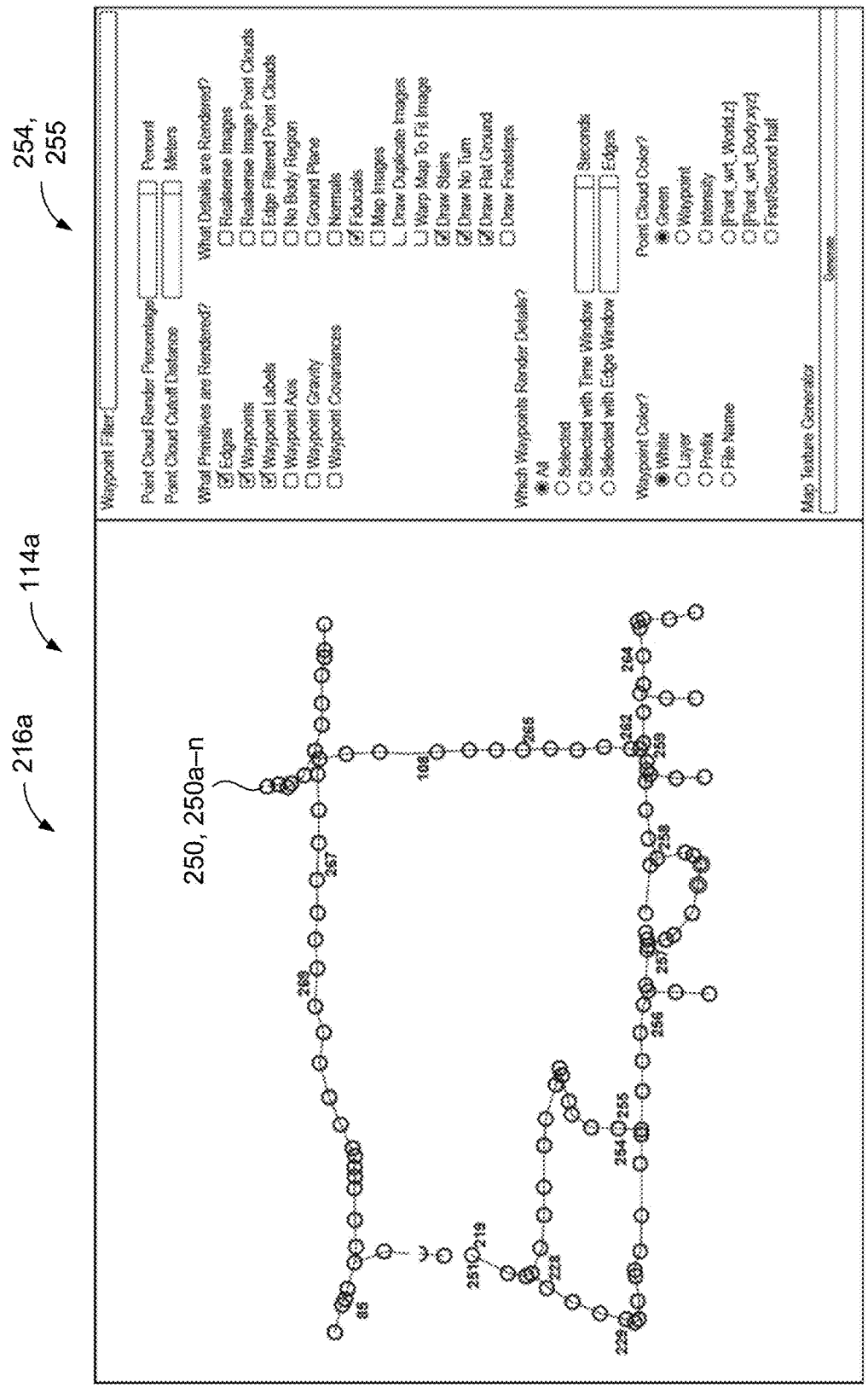
FIGS. 2A and 2B are schematic views of exemplary environmental maps.
Figure 2B:
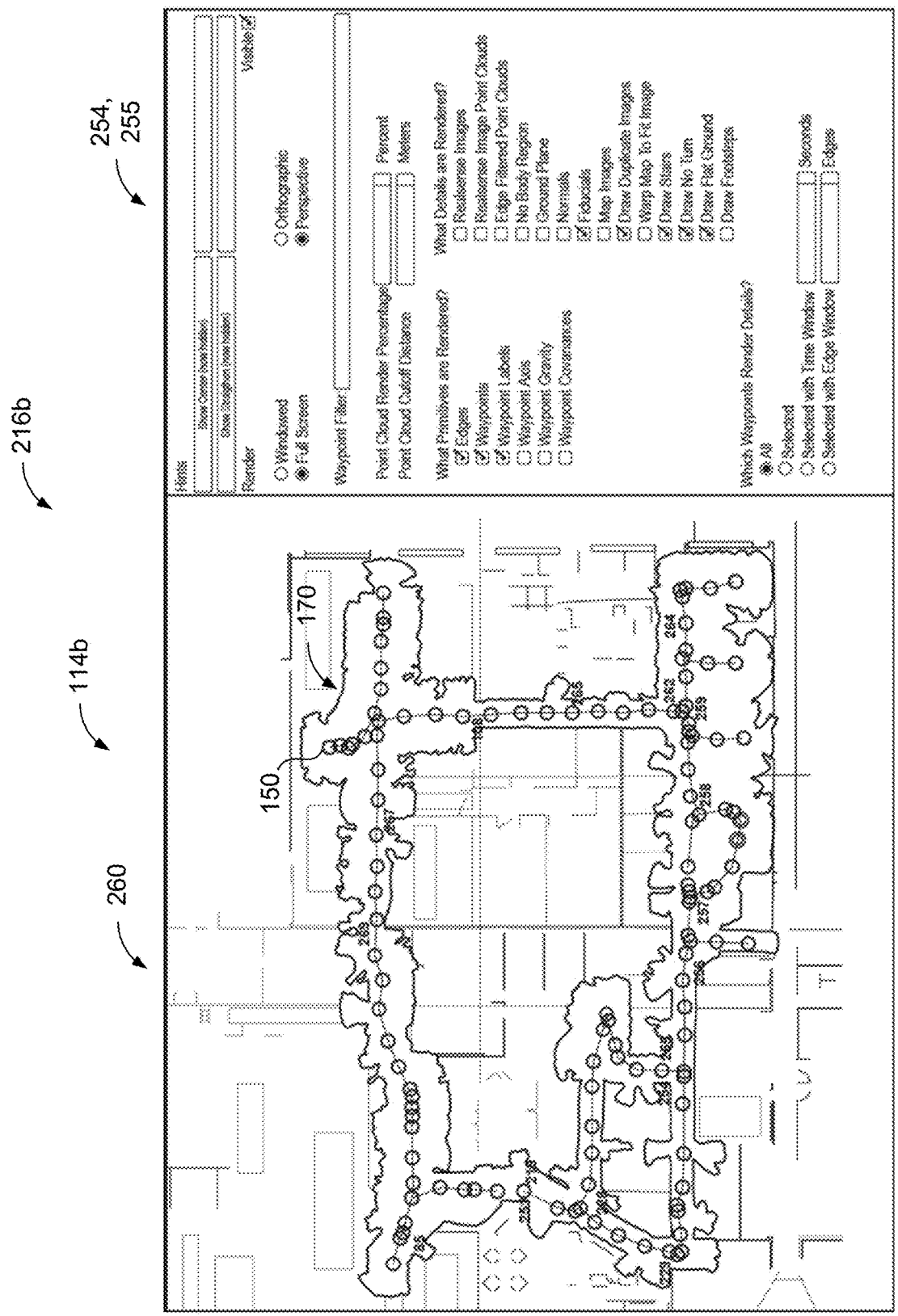

FIGS. 2A and 2B include example user interfaces 216*a*, 116*b* depicting the MGAL 110 generating environmental maps 114*a*, 114*b* in response to user input 44 and the captured sensor data 17. The user interface includes a window displaying the generated maps 114*a*, 114*b* and a map option window 254 presenting user-selectable options to filter and otherwise manipulate data of the map 114. For example, environmental map 114*a* (FIG. 2A) includes waypoints 250, 250*a-n* placed by the robot 10 while traversing the environment 8 that loosely represent real space. This environmental map 114*a* does not include any high level building information. Map options 255 allow the user 42 (via, for example, the user device 300) to filter and otherwise manipulate the data of the environmental map 114*a*. As another example, the environmental map 114*b* (FIG. 2B) includes a blueprint 260 of the environment 8 overlain on the environmental map 114*b*. This example also includes a texture 170 generated by the robot 10 from the sensor data 17 to increase context for the user 42 when creating and/or planning missions.

Changes in the environment (e.g., the addition or removal of obstacles) may outdate the current environment map 114. That is, the robot 10 may no longer be able to successfully navigate the environment 8 using the outdated environmental map 114. In this situation, the MGAL 110 may generate an updated environmental map 114 representative of the environment 8 about the robot 10 based on new received sensor data 17 of the environment 8 about the robot 10 while the robot traverses through the environment 8. That is, the robot 10 may again traverse the environment 8 recording sensor data 17 to update the environmental map 114 to reflect any changes to the environment 8 since generating the last environmental map 114. Optionally, when updating the environmental map 114, the action recorder 120 may also simultaneously, and automatically generate a second/updated behavior tree 122 for navigating and/or controlling the robot 10 to perform the respective action 420 at each corresponding target location 52 of the one or more target locations 52 within the environment 8 during the future mission when the current position of the robot 10 within the updated environmental map 114 reaches the corresponding target location 52. The second or updated behavior tree 122 thus updates the mission to include any environmental changes reflected in the updated environmental map 114. Thus, the online authoring system 100 saves the user 42 time by allowing the reuse of old actions 420 with a new or updated environmental map 114, as the user 42 does not need to re-record actions 420 after recording the actions 420 a first time while regenerating the environmental map 114. In some examples, the online authoring system 100 reuses old actions 420 when locations in the updated environmental map 114 maintain the same names as equivalent locations within the old or original environmental map 114. For example, one or more of the waypoints 250 in the environmental map 114 may each be associated with, or otherwise assigned/labeled, a specific name. The specific names associated with these waypoints 250 may transfer to equivalent waypoints in an updated version of the environmental map 114. Maintaining the same name with the same or similar waypoints 250 between the original environmental map 114 and the updated environmental map 114 may allow the online authoring system 100 to transfer the action 420 to the updated environmental map 114 without requiring re-re-cording of the action 420.

In some implementations, at least a portion of the online authoring system 100 executes on a remote device in communication with the robot 10. For instance, the action recorder 120 may execute on a remote device to record actions 420 while the map generator and localizer 110 executes locally on the robot 10. Optionally, the entire online authoring system 100 may execute on a remote device and the vision system 14 may transmit sensor data 17 to the remote device for map generation and action recording. In some examples, the remote device includes the user device 300 executing at least a portion of the online authorizing system 100. In additional examples, the remote device includes a remote computing device (e.g., a cloud-based server) in communication with the user device 300 and the robot 10.

FIG. 3 shows an example user device 300 used by the user 42 for controlling/navigating the robot 10 around the environment 8. The user device 300 includes a housing 310 with a screen 320 and a plurality of controls 330 situated around the screen 320. As shown, the controls 330 are located on the front and top edge of the housing 310, and include buttons 330a, control sticks 330b, directional d-pad 330c, and shoulder buttons 330d. The housing 310 is shaped to be held in both hands of the user 42 such that the user's 10 thumbs are positioned to operate controls located on the front of the user device 300 (e.g., the control sticks 330b) and the user's 10 index fingers are positioned to operate controls located on the top edge of the user device 300 (e.g., shoulder buttons 330d). The user device 300 may also include one or more additional controls located on the back of the user device 300 in a position to be operated by the user's 10 other fingers. The user device 300 may include a dedicated device/controller for controlling the robot, or may include an off-the-shelf computing device that may execute one or more applications 324 for use in controlling the robot 10. For instance, the user device 300 may include a mobile computing device, such as a smart phone or tablet that may execute one or more applications 324 for controlling the robot 10.

The display (e.g., screen) 320 shows the user 42 an image or scene 322 of the environment 8 based on the sensor data 17 captured by the robot 10. In some examples, the screen 320 presents the scene 322 as a video feed.

The user device 300 further includes, inside the housing 310, a processing device 340, a storage device 350 (e.g., memory device), and a communication interface 360. In the example shown, the processing device 340 executes a graphical user interface (GUI) 321 for display on the screen 320 to present the scene 322 of the environment 8 for the user 42 to view. The user device 300 may include additional components not depicted in FIG. 3. The processing device 340 can include one or more processors that execute computer-executable instructions and associated memory (e.g., RAM and/or ROM) that stores the computer-executable instructions. In implementations where the processing device 340 includes more than one processor, the processors can execute in a distributed or individual manner. The processing device 340 can execute an operating system 342 one or more applications for navigating the robot 10 in the environment 8. In some examples, the processing device 340 executes other applications 344, which may be native or non-native to the user device 300, such as a web browser, all of which can be implemented as computer-readable instructions. In some examples, the processing device 340 executes at least a portion of the online authoring system 100.

The storage device 350 can include one or more computer-readable mediums (e.g., hard disk drives, solid state memory drives, and/or flash memory drives). The storage device 350 can store any suitable data that is utilized by the operating system 342, and the other applications 344. The communication interface 360 includes one or more devices that are configured to communicate with the robot 10 in the environment 8. In some implementations, the communication interface 360 is configured to communicate with the robot 10 by way of a network. The communication interface 360 can include one or more transceivers for performing wired or wireless communication. Examples of the communication interface 360 can include, but are not limited to, a transceiver configured to perform communications using the IEEE 802.11 wireless standard, an Ethernet port, a wireless transmitter, and a universal serial bus (USB) port.

Thus, the robot 10 collects information (e.g., sensor data 17) about the environment 8 surrounding the robot 10 was well as information associated with operating in the environment 8. The robot 10 may send some or all of this information to the user device 300, including an image of the environment 8 captured by the robot 10. The user device 300 then displays the image to the user 42 so that the user 42 can view the environment 8 that the robot 10 is operating in, which in this example is the interior of a warehouse. In some examples, the user 42 views the environment 8 from the perspective of the robot 10. Such a "first person" experience may be beneficial to certain applications of the online authoring system 100. The user device 300 displays the image of the environment 8 on the graphical user interface 321 and the user 42 may provide a navigation input indicating selection of a location within the image that corresponds to a physical location (e.g., a target location T) in the environment 8 where the user 42 wants the robot 10 to navigate. In some examples, the navigation input indicating selection of the location within the image is sent from the user device 300 to the robot 10 as a point in world space corresponding to an origin the scene of the environment 8 is rendered from, as well as a direction in world space corresponding to the location within the image selected by the user 42. For instance, the user device 300 may execute the GUI 321 for displaying the image of the environment 8 on the screen 320 of the user device 300 and the user 42 may provide the navigation input by touching the location within the image to navigate the robot 10 to the target location T. In additional examples, the user 42 provides the navigation input via a physical button, mouse, joystick, or any other input mechanism. As used herein, the navigation input refers to an input indication selection of the location with the image that corresponds to the target location T (e.g., physical location).

Figure 4:
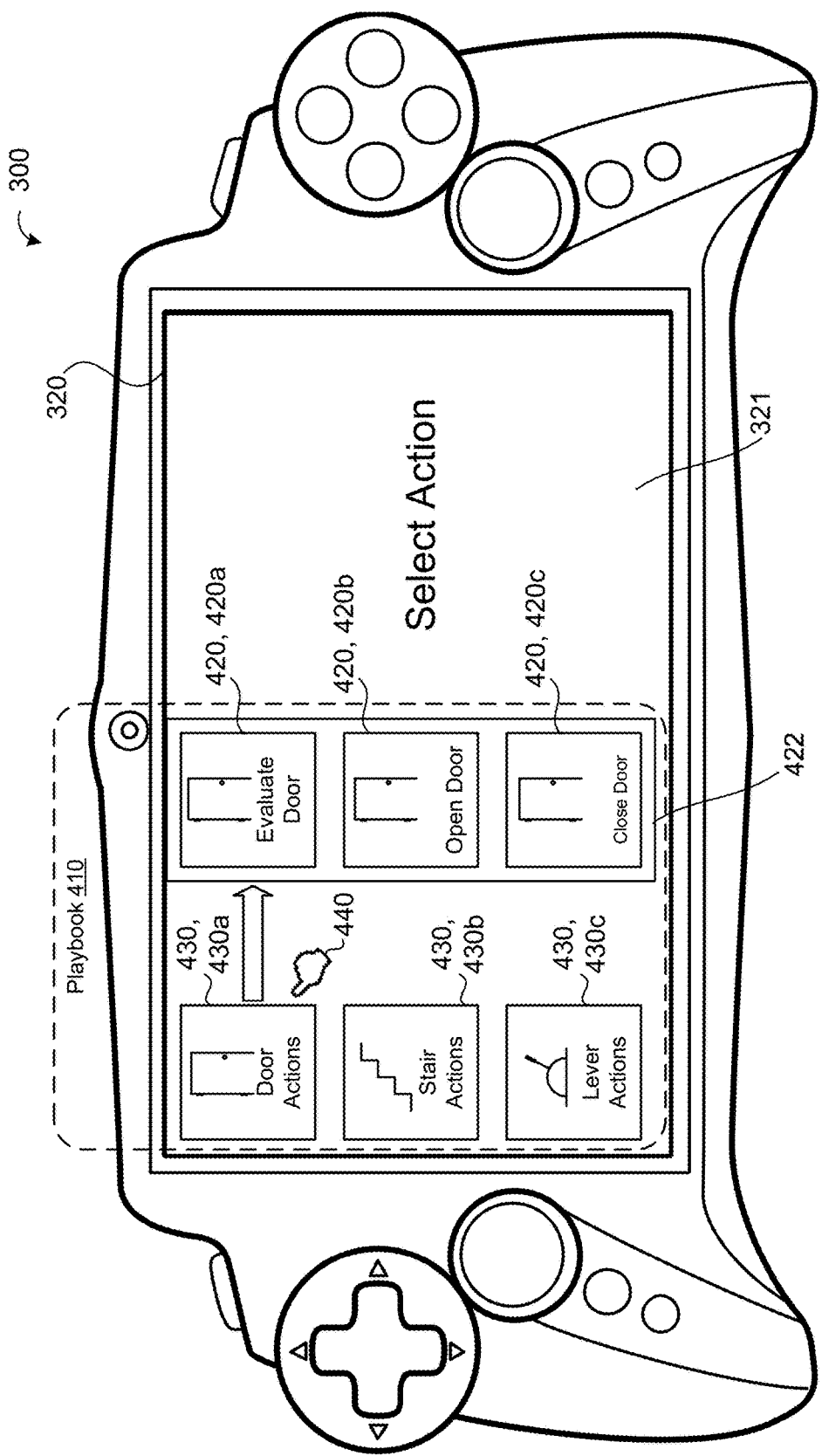
FIG. 4 is a schematic view of a playbook of actions displayed on the user device of FIG. 3.

Referring now to FIG. 4, in some implementations, the GUI 321 of the user device 300 presenting a playbook 410 of one or more actions 420, 420a—n for the robot to perform at a corresponding location of at least one of the one or more target locations 52 in the environment. The GUI 321 may display an action selection window 422 presenting one or more of the actions 420, 420a—c that are available for selection by the user 42 for the robot 10 to perform. That is, when the current position of the robot 10 reaches the target location 52 while generating the environmental map 114, the GUI 321 may receive a user input indication indicating a selection of a respective action 420 from the playbook 410 that the user 42 wants the robot 10 to perform at the target location 52. In response to receiving the user input indication (e.g., cursor) 440 indicating selection of the respective action 420, the user device 300 may issue an action recording request 450 (FIG. 1) that causes the action recorder 120 to record the respective action 420 for the robot 10 to perform at the corresponding location of the target location 52. The user device 300 may display the GUI 321 on the screen 320 of the user device 300.

In the example shown, the exemplary actions 420 available for selection in the action selection window 422 include evaluating a door 50 (e.g., determining whether a door is open or closed), opening a door 420b, and closing a door 420c. In some examples, actions 420 are sorted into categories 430, 430a—n. For example, categories 430 include a door action category 430a, a stair action category 430b, and a lever action category 430c. The user 42 may interact with any category 430 (e.g., via a cursor 440, via touch, etc.) to display the corresponding actions 420 in that category 430. For instance, a user input indication 440 indicating selection of the stair actions category 430 may cause the action selection window 422 to present one or more actions that relate to stairs in the environment 8. Thus, the user 42 may navigate the robot 10 via the user device 300 to a target location 52 and then select the appropriate action 420 from the playbook 410 for that target location 52.

Referring back to FIG. 1, in some examples, prior to recording the respective action 420 for the robot 10 to perform, the action recorder 120 receives the action recording request 450 from the user device 300 when the current position of the robot 10 within the environmental map 114 reaches the corresponding target location 52. The action recording request 450 requests the action recorder 120 to record the respective action 420 selected from the playbook 410 (FIG. 4) for the robot 10 to perform at the corresponding target location 52. That is, the user 42, via the user device 300, may navigate the robot 10 to the corresponding target location 52 prior to sending the action recording request 450 to the robot 10. For example, when the intended action 420 includes interacting with the door 50, the robot 10 may first navigate to the target location 52 (FIG. 1) in front of the door 50.

Optionally, recording the respective action 420 for the robot 10 to perform at the corresponding target location 52 includes the online authoring system 100 associating the current position of the robot 10 within the environmental map 114 with the respective action 420 for the robot 10 to perform at the corresponding target location 52 and storing (e.g., in memory hardware 38) the association of the current position of the robot 10 within the environmental map 114 with the respective action 420 for the robot 10 to perform at the corresponding target location 52. That is, the current location of the robot may be the same as the target location 52. Alternatively, the user 42 may indicate the target location 52 via the environmental map 114 or sensor data 17 (displayed via the user device 300) and the robot 10 may reference the target location 52 to the current location of the robot 10. For example, in the example of FIG. 4, the user 42 may select/reference the target location 52, T depicted in the scene 322 ahead of the current position of the robot 10 and associate the respective action 420 with the target location 52, T so that when the robot 10 navigates to the target location 52 during a future mission, i.e., after generating the map 114 and recording the respective action 420, the robot 10 will perform the respective action 420.

Figure 5:
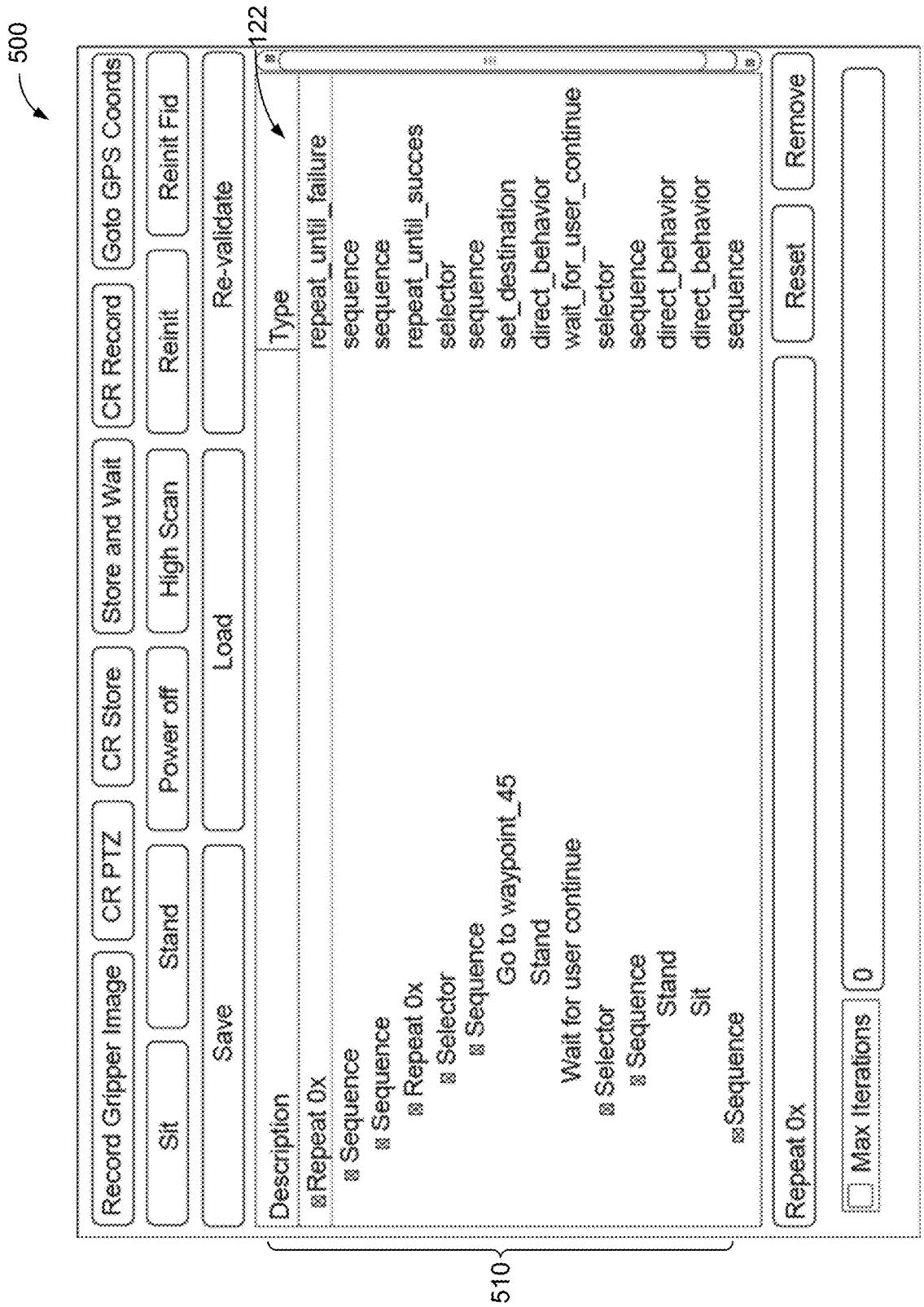
FIG. 5 is a schematic view of a traditional manually created behavior tree.

Conventional techniques for recording actions 420 for future missions involve a user manually creating and editing a behavior tree. For example, FIG. 5 shows a conventional user interface 500 displaying a behavior tree 122 that includes a sequence of behaviors 510 that have been manually selected by a user. This process of manually selecting each behavior in the sequence of behavior assemble an action for a robot to perform is often tedious, slow, and prone to errors as an error in a portion of the sequence will propagate through all subsequent behaviors in the sequence.

In contrast to this conventional technique, implementations herein include the online authoring system 100 automatically generating the behavior tree 122 in response to the action(s) 420 selected by the user 42 from the playbook 410. That is, in some examples, the playbook 410 of actions 420 associated with the corresponding target location 52 includes a collection of prebuilt behavior tree portions 620, 620a-n associated with the corresponding target location 52. Each prebuilt behavior tree portion 620 includes a plurality of nodes 622. Each node may be a root node 622a, a control flow node 622b, or an execution node 622c. The behavior tree portion 620 begins at the root node 622 and each control flow node 424 (e.g., a selector node or sequence node) controls subtasks below it. The execution nodes 426 each perform a simple task such as standing, stopping, or taking a picture. These nodes 622, when combined with other tasks allow the robot to perform a complex action 420 at the corresponding target location 52. The action recorder 120 may generate the behavior tree 122 by combining two or more prebuilt behavior tree portions 620. Each prebuilt behavior tree portion 620 of the combined two or more prebuilt behavior tree portions 620 may be associated with a different corresponding target location 52 and selected from the corresponding collection of prebuilt behavior tree portions 620 associated with the corresponding target location 52.

Figure 6A:
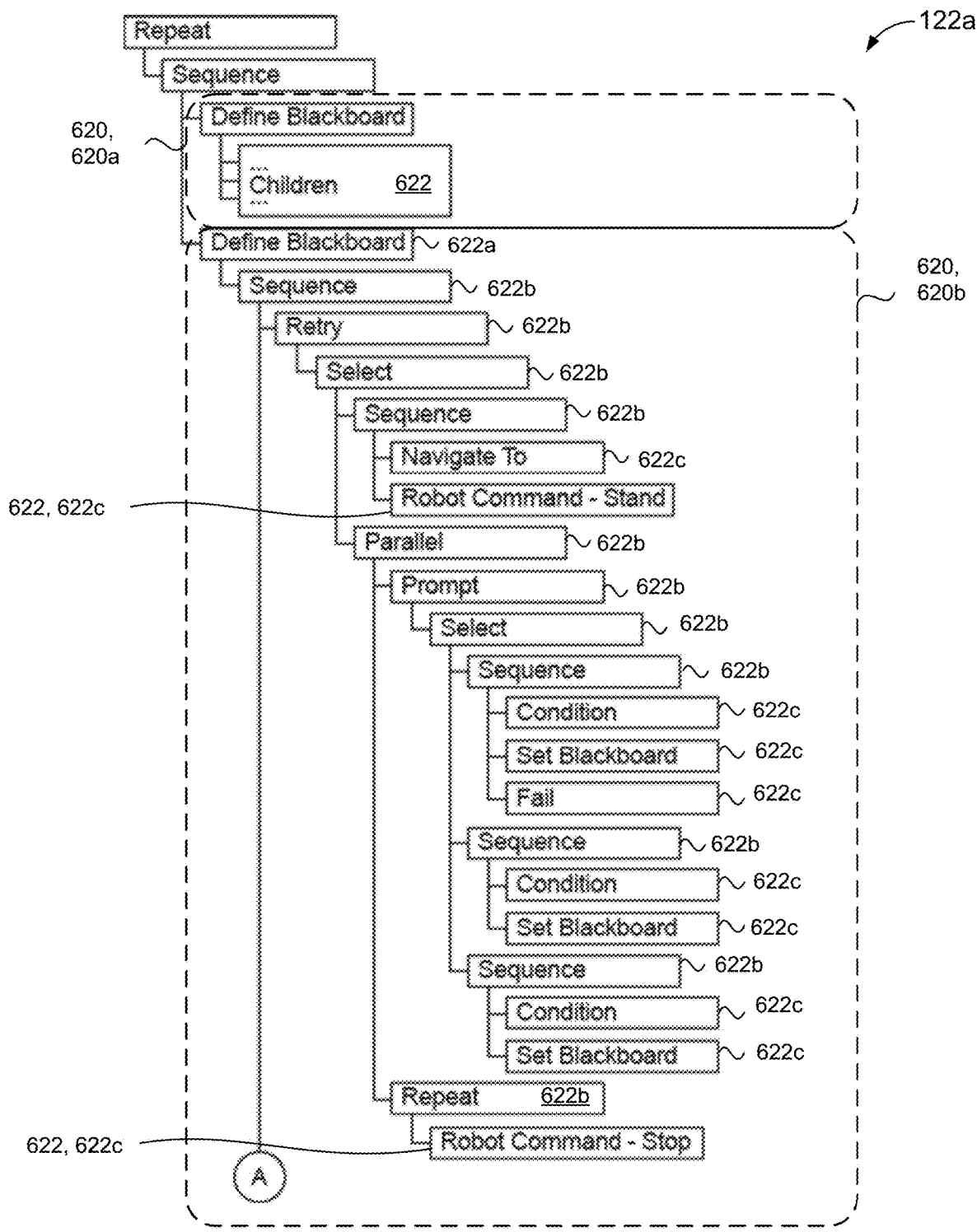
FIGS. 6A and 6B are schematic views of exemplary behavior trees automatically generated by components of the system of FIG. 1.
Figure 6B:
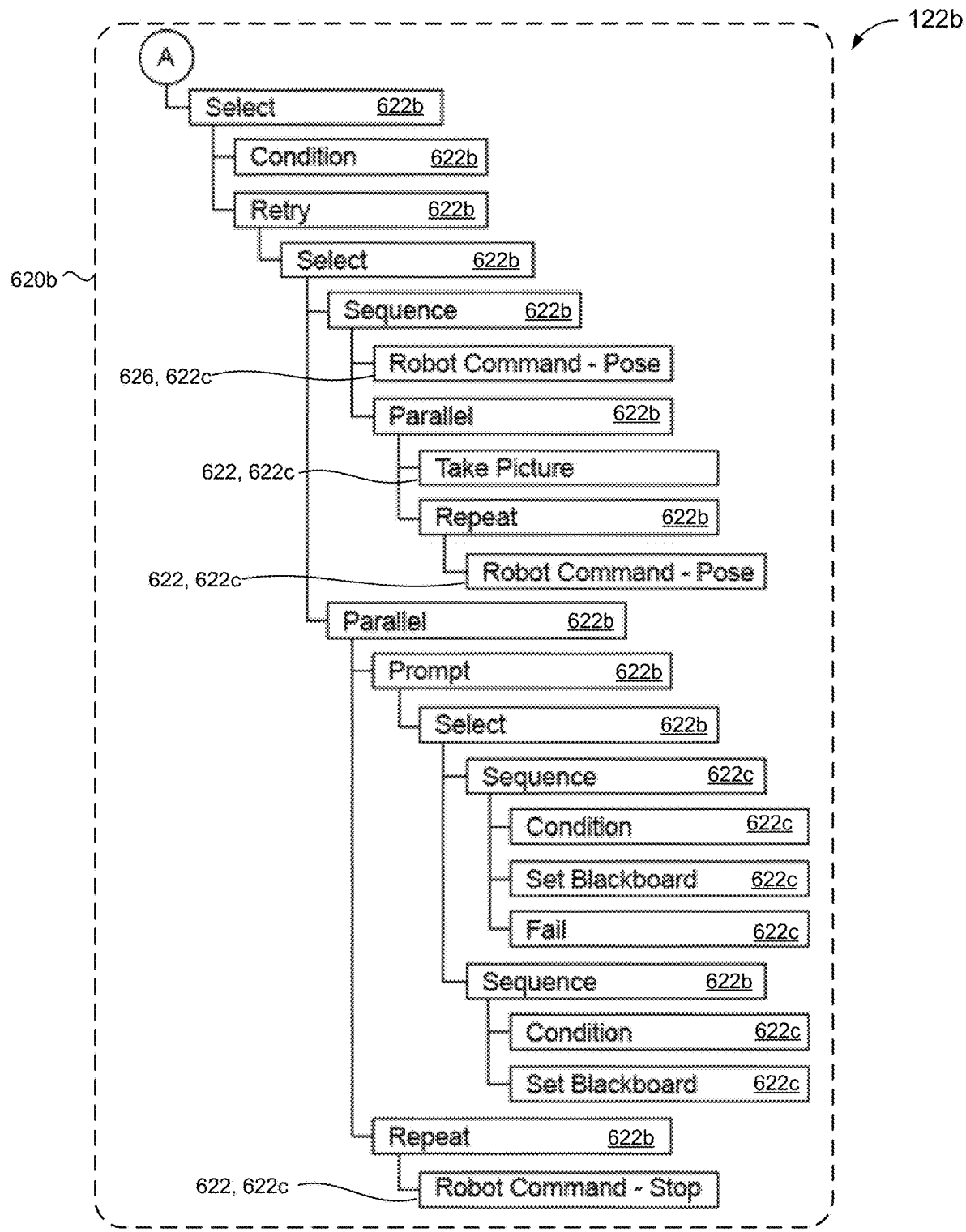

FIGS. 6A and 6B provide sections 122a, 122b of a behavior tree 122 automatically generated by the online authoring system 100 to perform an "Autowalk" which includes navigating the robot 10 to a target location 52 within the environmental map 114 and taking a picture. FIG. 6A illustrates a first prebuilt portion 620a (for an "Autowalk" element) that has the children nodes 622 collapsed for illustration purposes. A second portion 620b includes an "Autowalk" element with each of the children nodes 622 illustrated. The second portion 620b also includes the nodes 622 illustrated in FIG. 6B. These exemplary nodes provide the execution sequence for the robot 10 to, for example, navigate to the target location 52, stand, stop, take a picture, etc. In some implementations, the user 42 may edit or modify the behavior tree 122 after generation. For example, the user 42 may adjust the structure of the behavior tree 122 or the contents of each portion 620.

In some examples, the action recorder 120 determines a corresponding orientation for the robot 10 for each respective action 420 recorded for the robot 10 to perform. For example, when the user 42 (via the user device 300) explicitly places the robot in a specific orientation while traversing and mapping the environment 8, the online authoring system 100 may automatically generate the behavior tree 122 with the same specific orientation.

Optionally, after generating the environmental map 114 and the behavior tree 122, and while the robot 10 navigates through the environment 8 during the future mission, the online authoring system 100 determines, using the environmental map 114 and the behavior tree 122, when the current position of the robot 10 within the environmental map 114 reaches one of the one or more target locations 52 within the environment 8 about the robot 10. When the current position of the robot 10 within the environmental map 114 reaches the one of the one or more target locations 52, the online authoring system may control the robot 10 to perform the respective action 420 at the corresponding target location 52.

Figure 7A:
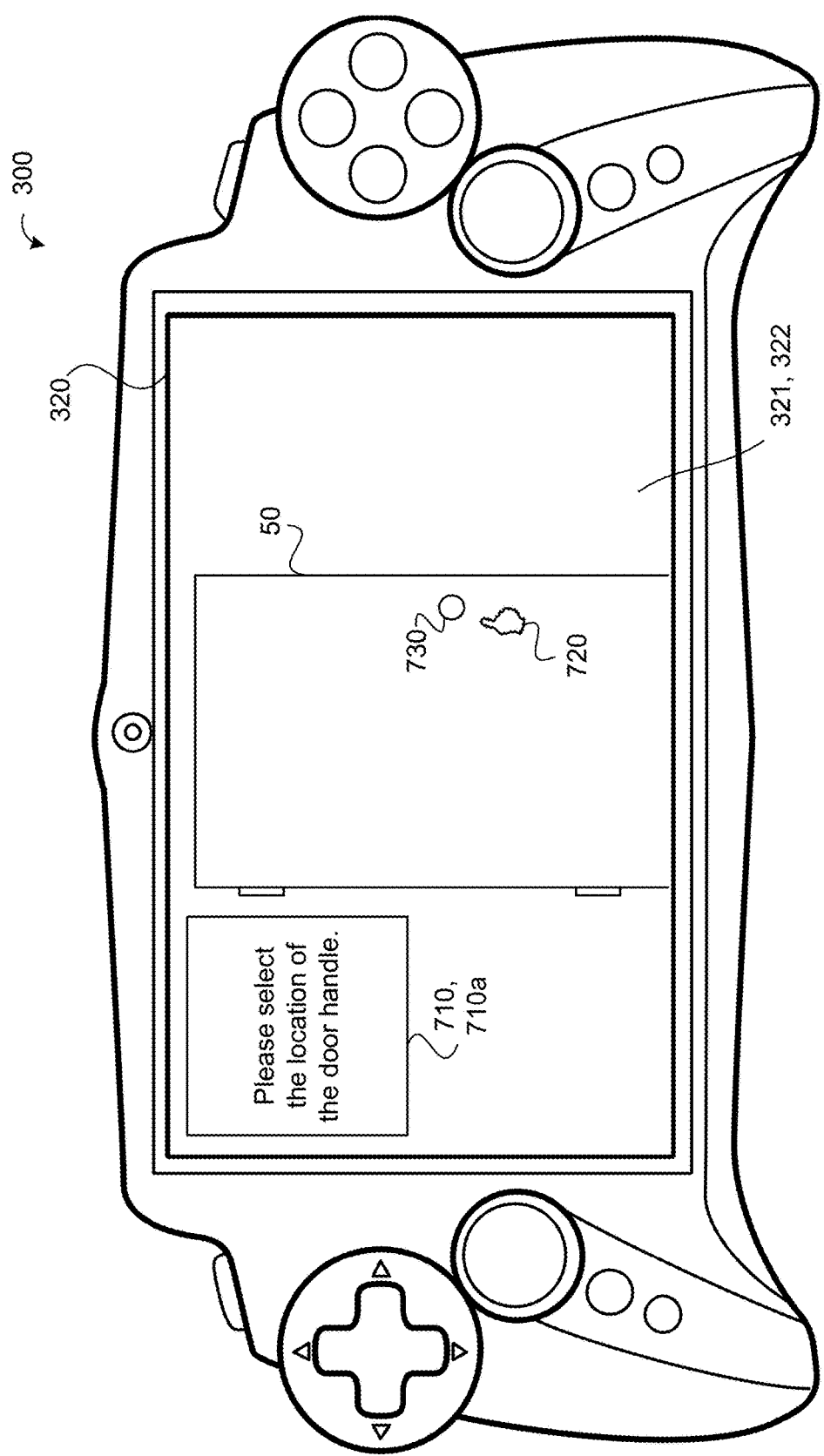
FIGS. 7A and 7B are schematic views of requests for additional information for an action displayed on the user device of FIG. 3.
Figure 7B:
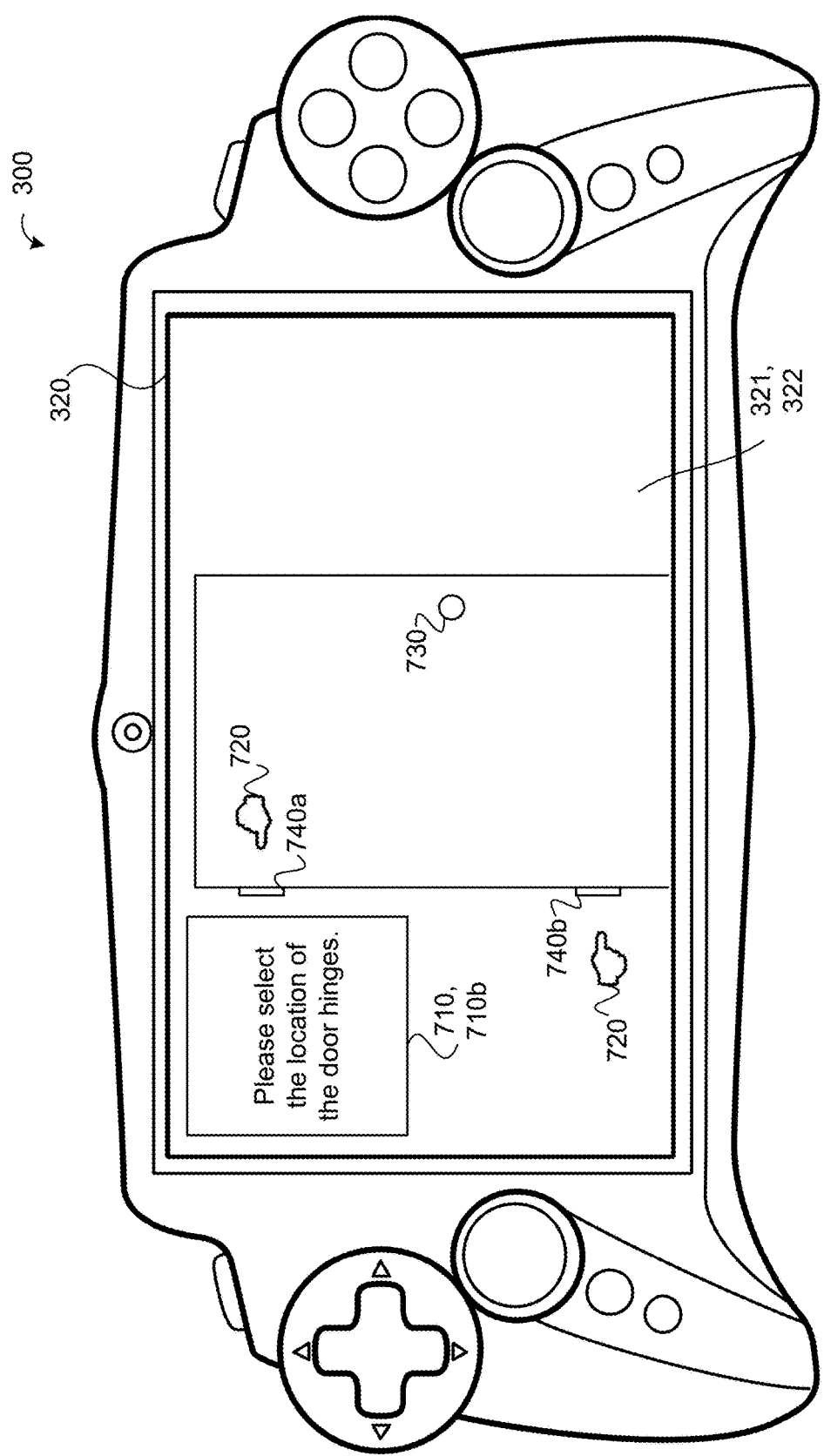

With reference to FIGS. 1, 7A, and 7B, in some implementations, in response to receiving the action recording request 450 from the user device 300 to record a respective action 420 for the robot 10 to perform at a particular target location 52, the online authoring system 100 obtains additional information 712 relevant to the respective action 420. Recording the respective action 420 for the robot 10 to perform at the corresponding target location 52 may also include recording the additional information 712 relevant to the respective action 420 for the robot 10 to perform at the corresponding target location 52. For instance, the additional information 712 may include additional data the online authorizing system 100 requires for recording so that the respective action 420 can be performed by the robot 10 during a future mission. FIGS. 7A and 7B show the GUI 321 displayed on the screen 320 of the user device 300 presenting a scene 322 of the environment 8 in front of the robot 10 for the user 42 to view when the robot 10 navigates to the target location 52 (FIG. 1) in front of the door 50. After selecting a relevant door action 420 (FIG. 4) from the playbook of actions 410 (FIG. 4), the online authoring system 100 may prompt 710 the user device 300 to obtain the additional information 712 relevant to the door action 420. Specifically, FIG. 7A shows the user device 300 displaying a first prompt 710*a* received from the online authoring system 100 in the GUI 121 that requests/prompts the user 42 to "Please select the location of the door handle". The user 42 may provide an input indication to the GUI 321 (e.g., using a cursor 720 or via touch with a finger or stylus) indicating selection of a location at or near the door handle 730, thereby causing the user device 300 to communicate the location of the door handle 730 to online authoring system 100 of the robot 10. The robot may store the location of the door handle 730.

Referring now to FIG. 7B, in some examples, the online authoring system 100 issues a second prompt 710*b* prompting the user device 300 to obtain even more additional information 712 relevant to the door action 420. In the example shown, the user device 300 displays the second prompt 710*b* received from the system 100 in the GUI 121 that requests/prompts the user 42 to "Please select the location of the door hinges". Similar to selection of the door handle 730, the user 42 may provide another input indication to the GUI 321 (e.g., with cursor 720 or via touch with a finger, stylus, etc.) indicating selection of a location at or near each of the door hinges 740*a*, 740*b* displayed within the scene 322, thereby causing the user device 300 to communicate the location of the hinges 740*a*, 740*b* to the online authoring system 100 of the robot 10. The robot 10 may store the location of the door hinges 740*a*, 740*b*. Thus, prompting the user 42 to provide the additional information 712 during mapping and while the user 42 is present allows the online authoring system 100 to gather/obtain accurate data from the user 42 and the environment 8 without the need to store large quantities of sensor data 17.

Figure 8:
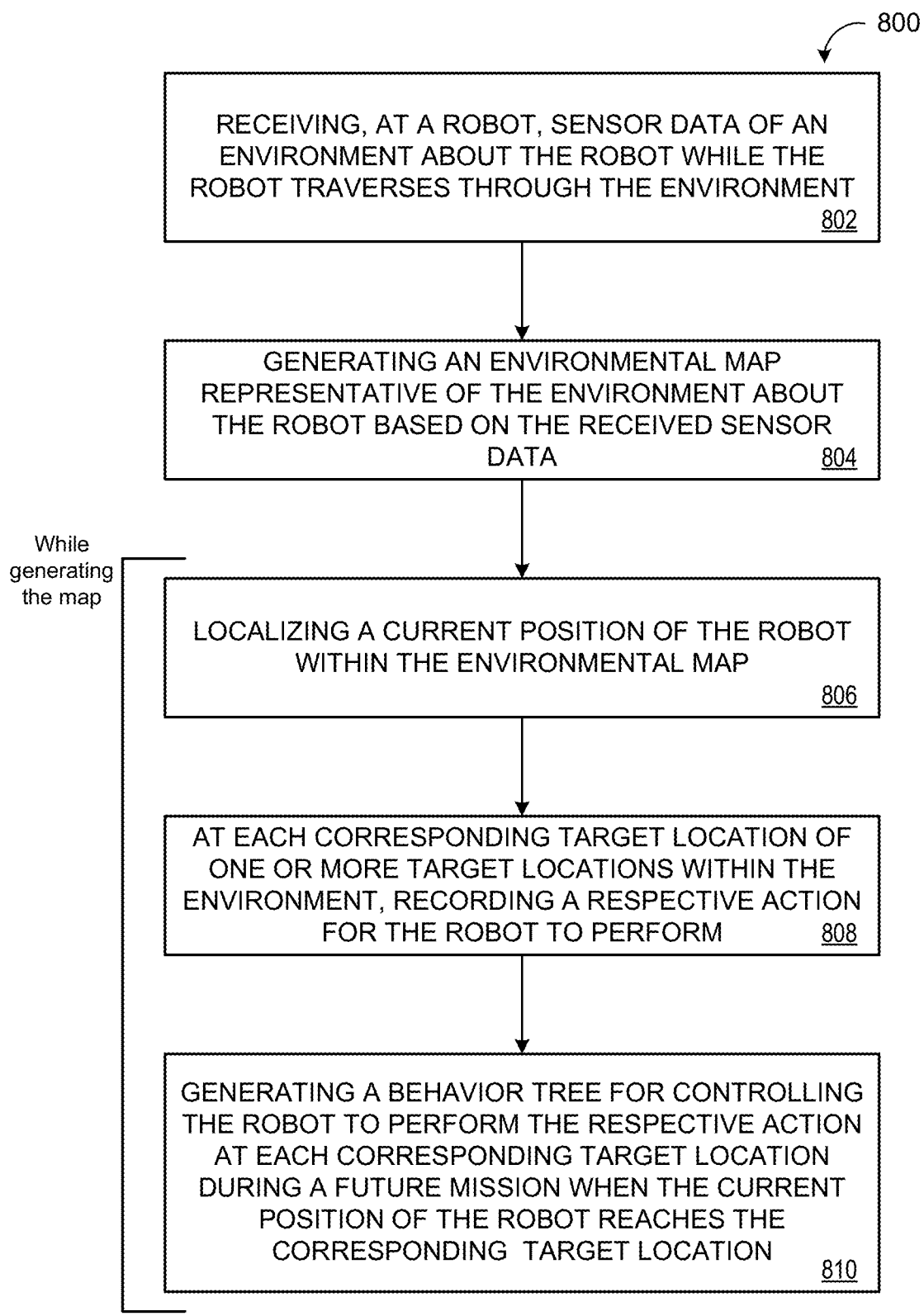
FIG. 8 is a flowchart of an example arrangement of operations for a method of online authoring of robot autonomy applications.

FIG. 8 is a flowchart of an exemplary arrangement of operations for a method 800 of online authoring of robot autonomy applications. The method 800, at operation 802, includes receiving, at data processing hardware 36 of a robot 10, from at least one sensor 31 in communication with the data processing hardware 36, sensor data 17 of an environment 8 about the robot 10 while the robot 10 traverses through the environment 8. At operation 804, the method 800 includes generating, by the data processing hardware 36, an environmental map 114 representative of the environment 8 about the robot 10 based on the received sensor data 17 of the environment 8 about the robot 10 while the robot 10 traverses through the environment 8.

While generating the environmental map 114, the method 800 includes, at operation 806, localizing, by the data processing hardware 36, a current position of the robot 10 within the environmental map 114. At operation 808, while generating the environmental map 114, the method 800 includes, at each corresponding target location 52 of one or more target locations 52 within the environment 8 about the robot 10, recording, by the data processing hardware 36, a respective action 420 for the robot 10 to perform. Still while generating the environmental map 114, the method 800 includes, at operation 810, generating, by the data processing hardware 36, a behavior tree 122 for navigating the robot 10 to each target location 52 and controlling the robot 10 to perform the respective action 420 at each corresponding target location 52 of the one or more target locations 52 within the environment 8 during a future mission when the current position of the robot 10 within the environmental map 114 reaches the corresponding target location 52.

Figure 9:
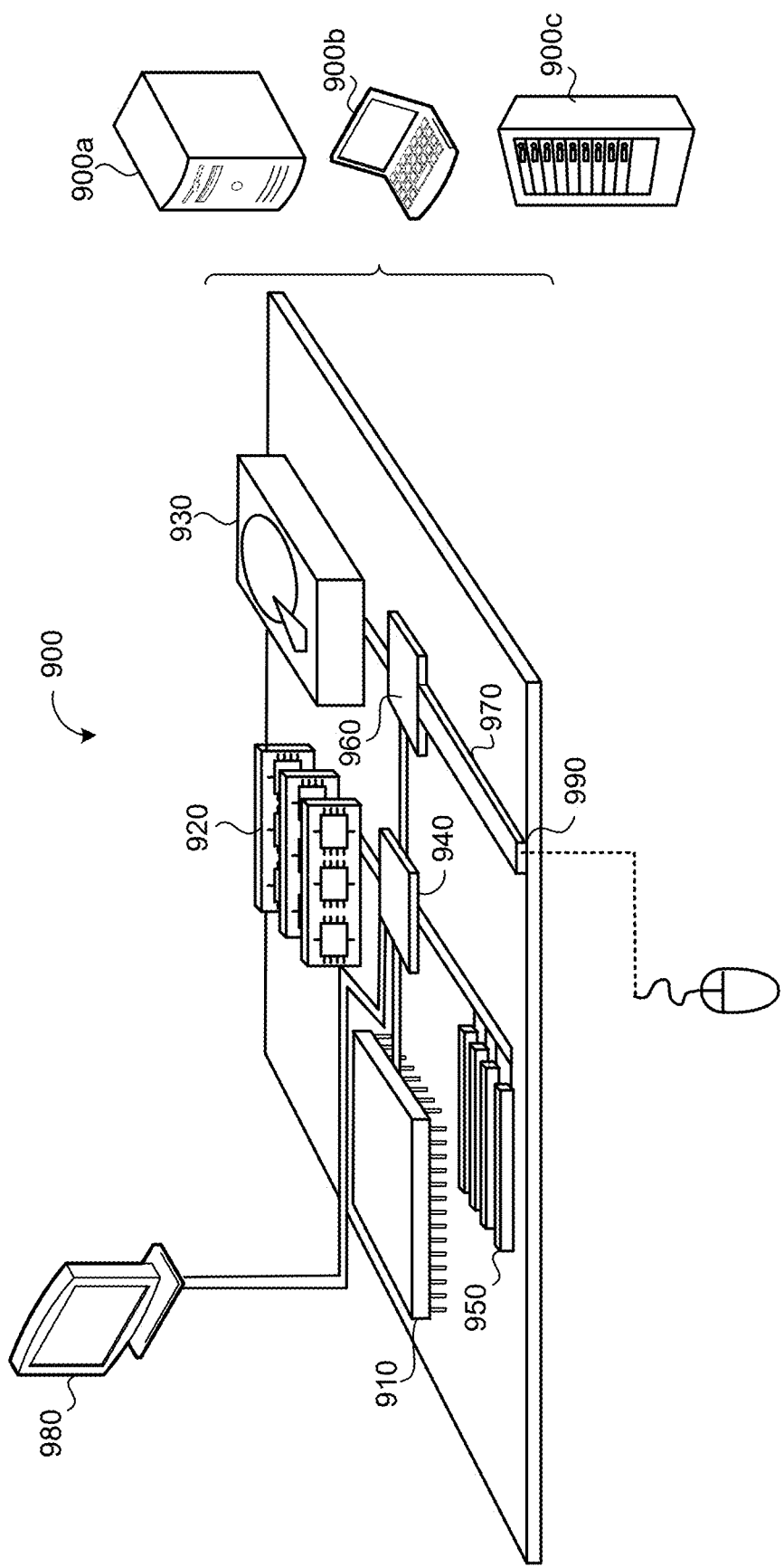
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware of a robot, from at least one sensor, sensor data associated with an environment of the robot based on a first traversal of the environment by one or more robots;
   generating, by the data processing hardware, an environmental map representative of the environment based on the received sensor data;
   identifying, by the data processing hardware, for performance at a first target location within the environment, a first plurality of actions available for selection based on the first traversal of the environment by the one or more robots, wherein the first plurality of actions available for selection is linked to the first target location;

providing, by the data processing hardware, to a user computing device, data indicative of the environmental map and the first plurality of actions available for selection;

receiving, by the data processing hardware, from the user computing device, data indicative of a first selected action for the robot to perform at the first target location chosen from the first plurality of actions available for selection;

based on receiving the data indicative of the first selected action for the robot to perform at the first target location, generating, by the data processing hardware, a mission, wherein the mission indicates the robot is to navigate from a location of the robot to the first target location based on the first plurality of actions available for selection being linked to the first target location, to determine that the location of the robot corresponds to the first target location, to perform the first selected action based on determining that the location of the robot corresponds to the first target location, and to navigate to a second target location; and instructing, by the data processing hardware, the robot to autonomously perform the mission, wherein performance of the mission corresponds to a second traversal of the environment by the robot.

2. The method of claim 1, wherein a second plurality of actions available for selection is linked to the second target location, wherein the second plurality of actions available for selection are different relative to the first plurality of actions available for selection, and wherein the mission further indicates the robot is to perform a second selected action, chosen from the second plurality of actions available for selection, at the second target location based on determining that the location of the robot corresponds to the second target location.

3. The method of claim 1, further comprising:
identifying for performance at the second target location, a second plurality of actions available for selection based on the first traversal of the environment by the one or more robots;
providing, to the user computing device, data indicative of the second plurality of actions available for selection; and
receiving, from the user computing device, data indicative of a second selected action for the robot to perform at the second target location chosen from the second plurality of actions available for selection, wherein the mission further indicates the robot is to determine that the location of the robot corresponds to the second target location and to perform the second selected action at the second target location based on determining that the location of the robot corresponds to the second target location.

4. The method of claim 1, further comprising:
identifying for performance at the second target location, the first plurality of actions available for selection based on the first traversal of the environment by the one or more robots; and
receiving, from the user computing device, data indicative of a second selected action for the robot to perform at the second target location chosen from the first plurality of actions available for selection, wherein the mission further indicates the robot is to determine that the location of the robot corresponds to the second target location and to perform the second selected action at the second target location based on determining that the location of the robot corresponds to the second target location.

5. The method of claim 1, further comprising:
generating a behavior tree based on the first selected action, wherein the behavior tree links the first target location to the first selected action, and wherein the mission is based on the behavior tree.

6. The method of claim 1, further comprising:
receiving, from the user computing device, an action recording request requesting recordation of the first selected action for the robot to perform at the first target location; and
automatically linking the first selected action to the first target location in response to receiving the action recording request.

7. The method of claim 1, wherein generating the mission comprises further comprising:
generating instructions for performance of the first selected action at the first target location.

8. The method of claim 1, wherein the first traversal of the environment and the second traversal of the environment are a traversal of a same portion of the environment.

9. The method of claim 1, further comprising:
receiving, from the user computing device, navigation instructions, wherein the navigation instructions instruct the robot to navigate to the first target location, wherein the mission is based on the navigation instructions.

10. The method of claim 1, wherein the first plurality of actions available for selection corresponds to a first category of actions of a plurality of categories of actions.

11. The method of claim 1, wherein the first plurality of actions available for selection comprises actions to interact with or evaluate an object in the environment.

12. The method of claim 1, further comprising:
determining an orientation of the robot, wherein the mission is based on the orientation of the robot.

13. The method of claim 1, further comprising:
providing, to the user computing device, second sensor data associated with the environment, wherein receiving the data indicative of the first selected action for the robot to perform at the first target location is based on providing the second sensor data.

14. The method of claim 1, further comprising:
receiving, from the user computing device, data indicative of the first target location, wherein generating the mission is further based on receiving the data indicative of the first target location.

15. The method of claim 1, wherein the at least one sensor comprises at least one of a stereo camera, scanning light-detection and ranging (LIDAR) sensor, or a scanning laser-detection and ranging (LADAR) sensor.

16. The method of claim 1, further comprising:
receiving, from the user computing device, an input; and
capturing the sensor data based on the input.

17. A system comprising:
data processing hardware; and
memory in communication with the data processing hardware, the memory storing instructions that when executed on the data processing hardware cause the data processing hardware to:
receive, from at least one sensor, sensor data associated with an environment of a robot based on a first traversal of the environment by one or more robots;

generate an environmental map representative of the environment based on the received sensor data;

identify, for performance at a first target location within the environment, a first plurality of actions available for selection based on the first traversal of the environment by the one or more robots, wherein the first plurality of actions available for selection is linked to the first target location;

provide, to a user computing device, data indicative of the environmental map and the first plurality of actions available for selection;

receive, from the user computing device, data indicative of a first selected action for the robot to perform at the first target location chosen from the first plurality of actions available for selection;

based on receiving the data indicative of the first selected action for the robot to perform at the first target location, generate a mission, wherein the mission indicates the robot is to navigate from a location of the robot to the first target location based on the first plurality of actions available for selection being linked to the first target location, to determine that the location of the robot corresponds to the first target location, and to perform the first selected action based on determining that the location of the robot corresponds to the first target location, and to navigate to a second target location; and instruct the robot to autonomously perform the mission, wherein performance of the mission corresponds to a second traversal of the environment by the robot.

18. The system of claim 17, wherein a second plurality of actions available for selection is linked to the second target location, wherein the second plurality of actions available for selection are different relative to the first plurality of actions available for selection, and wherein the mission further indicates the robot is to perform a second selected action, chosen from the second plurality of actions available for selection, at the second target location based on determining that the location of the robot corresponds to the second target location.

19. A robot comprising:
at least one sensor;
at least two legs;
data processing hardware in communication with the at least one sensor; and
memory in communication with the data processing hardware, the memory storing instructions that when executed on the data processing hardware cause the data processing hardware to:

receive, from the at least one sensor, sensor data associated with an environment of the robot based on a first traversal of the environment by one or more robots;

generate an environmental map representative of the environment based on the received sensor data;

identify, for performance at a first target location within the environment, a first plurality of actions available for selection based on the first traversal of the environment by the one or more robots, wherein the first plurality of actions available for selection is linked to the first target location;

provide, to a user computing device, data indicative of the environmental map and the first plurality of actions available for selection;

receive, from the user computing device, data indicative of a first selected action for the robot to perform at the first target location chosen from the first plurality of actions available for selection;

based on receiving the data indicative of the first selected action for the robot to perform at the first target location, generate a mission, wherein the mission indicates the robot is to navigate from a location of the robot to the first target location based on the first plurality of actions available for selection being linked to the first target location, to determine that the location of the robot corresponds to the first target location, to perform the first selected action based on determining that the location of the robot corresponds to the first target location, and to navigate to a second target location; and instruct the robot to autonomously perform the mission, wherein performance of the mission corresponds to a second traversal of the environment by the robot.

20. The robot of claim 19, wherein a second plurality of actions available for selection is linked to the second target location, wherein the second plurality of actions available for selection are different relative to the first plurality of actions available for selection, and wherein the mission further indicates the robot is to perform a second selected action, chosen from the second plurality of actions available for selection, at the second target location based on determining that the location of the robot corresponds to the second target location.

* * * * *